United States Patent
James et al.

(10) Patent No.: US 12,020,176 B2
(45) Date of Patent: Jun. 25, 2024

(54) ARTIFICIAL-INTELLIGENCE ARCHITECTURE FOR DETECTING DOCUMENT MANIPULATION

(71) Applicant: Lendbuzz, Inc., Boston, MA (US)

(72) Inventors: Hailey James, American Fork, UT (US); Otkrist Gupta, Somerville, MA (US); Dan Raviv, Newton, MA (US)

(73) Assignee: LENDBUZZ, INC., Boston, MA (US)

( * ) Notice: Subject to any disclaimer, the term of this patent is extended or adjusted under 35 U.S.C. 154(b) by 747 days.

(21) Appl. No.: 17/216,156

(22) Filed: Mar. 29, 2021

(65) Prior Publication Data

US 2022/0309365 A1 Sep. 29, 2022

(51) Int. Cl.
*G06N 5/04* (2023.01)
*G06F 16/93* (2019.01)
*G06N 20/00* (2019.01)

(52) U.S. Cl.
CPC ............... *G06N 5/04* (2013.01); *G06F 16/93* (2019.01); *G06N 20/00* (2019.01)

(58) Field of Classification Search
None
See application file for complete search history.

(56) References Cited

PUBLICATIONS

Hameed, et al., Machine Learning-based Offline Signature Verification Systems: A Systematic Review, Signal Processing Image Communication 93(4):116139, Jan. 2021, pp. 1-34 (Year: 2021).*
Joren, et al., OCR Graph Features for Manipulation Detection in Documents, arXiv:2009.05158v2 [cs.CV], Sep. 14, 2020, pp. 1-8 (Year: 2020).*
Lago, et al., Visual and Textual Analysis for Image Trustworthiness Assessment within Online News, Security and Communication Networks, vol. 2019, Apr. 14, 2019, Article ID 9236910, pp. 1-15 (Year: 2019).*
Ammar, et al., A Multi-Stage Deep-Learning-Based Vehicle and License Plate Recognition System with Real-Time Edge Inference, Sensors 2023, 23(4), 2120, Feb. 13, 2023, pp. 1-27 (Year: 2023).*

* cited by examiner

*Primary Examiner* — Wilbert L Starks
(74) *Attorney, Agent, or Firm* — Kilpatrick Townsend & Stockton LLP (57) ABSTRACT

The present disclosure generally relates to techniques for constructing an artificial-intelligence (AI) architecture. The present disclosure relates to techniques for executing the AI architecture to detect whether or not characters in a digital document have been manipulated. The AI architecture can be configured to classify each character in a digital document as manipulated or not manipulated by constructing a graph for each character, generating features for each node of the graph, and inputting a vector representation of the graph into a trained machine-learning model to generate the character classification.

20 Claims, 7 Drawing Sheets

ARTIFICIAL-INTELLIGENCE ARCHITECTURE FOR DETECTING DOCUMENT MANIPULATION

TECHNICAL FIELD

The present disclosure generally relates to techniques for constructing an artificial-intelligence (AI) architecture. More specifically (but not by way of limitation), the present disclosure relates to techniques for detecting manipulated characters in a digital document using the AI architecture.

BACKGROUND

Digital documents have been increasingly used to verify information. For example, a digital document, such as a lease, can be used to verify an individual's address. Verifying information using digital documents can create opportunities for deception through document manipulation. Recent technological advances have made manipulation of digital documents easier than ever, allowing forgers to manipulate key portions (e.g., address, name, or salary) of a digital document. For example, a forger can use image editing software to alter characters in the digital document.

Document manipulation can be technically challenging to detect, however, because certain digital documents do not contain colors or textures. Colors or textures within a digital document can often be analyzed to detect manipulation. For example, a lack of uniformity in a color or texture of a digital document often indicates a manipulation. The techniques for analyzing the color or texture contained within a digital document may not be useful for digital documents that contain mostly text without color or texture. For example, many digital documents contain black text, little or no color, and an entirely white background. Additionally, there are a variety of mechanisms available to alter a character or word in a digital document without color or texture. For example, forgers can copy and paste from another portion of the digital document, splice from a different digital document, or insert new characters by changing individual pixels of the digital document. Accordingly, detecting manipulation on digital documents without color or textures can be a significant technical challenge.

SUMMARY

Certain aspects and features of the present disclosure relate to a computer-implemented method. The computer-implemented method can include accessing a digital document that includes a plurality of characters and defining a bounding box that surrounds each character of the plurality of characters. The computer-implemented method can also include executing a workflow for detecting a manipulated character in the digital document. The workflow can include generating a graph that represents a character of the plurality of characters. For example, the graph can include a set of nodes. Each node of the set of nodes can correspond to one of the bounding boxes defined in the digital document. The computer-implemented method can include extracting one or more features for each node of the set of nodes of the graph. The computer-implemented method can also include combining the one or more features for each node of the set of nodes of the graph into a single vector representation and inputting the single vector representation of the graph into a trained machine-learning model. The computer-implemented method can also include determining, based on an output of the trained machine-learning model, a classification of the character as manipulated or not manipulated.

Certain aspects and features of the present disclosure can also relate to a system for performing part or all of one or more operations or processes disclosed herein. The system can include one or more computers configured to perform part or all of one or more methods, processes, or operations disclosed herein by virtue of having software, firmware, hardware, or a combination of them installed on the system.

Certain aspects and features of the present disclosure can also relate to a computer-program product that is tangibly embodied in a non-transitory machine-readable storage medium and that includes instructions configured to cause one or more data processors to perform part or all of one or more methods, processes, or operations disclosed herein.

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

BRIEF DESCRIPTION OF THE DRAWINGS

The specification makes reference to the following appended figures, in which use of like reference numerals in different figures is intended to illustrate like or analogous components.

DETAILED DESCRIPTION

Certain aspects and features of the present disclosure relate to an AI architecture configured to detect manipulated characters in a digital document. For example, a digital document can be a text file that includes one or more alphanumeric characters over a white background. Manipulating a digital document can include manipulating pixels representing a character, copying one or more characters in one area of the digital document and pasting those characters to another area of the digital document, or splicing one or more characters from another digital document and pasting those characters into the digital document. As an illustrative example of pixel manipulation, individual pixels can be manipulated to change a lowercase "c" to a lowercase "o". The gap in the lowercase "c" can be manipulated by filing in the gap to change the character to a lowercase "o". Due to the lack of color or texture in the digital document, detecting the pixel manipulation using computer systems can be a technical challenge. Certain aspects and features of the present disclosure relate to providing the AI architecture to improve the functioning of computer systems by enabling computer systems to automatically detect document manipulation, such as the pixel manipulation in the aforementioned illustrative example.

In some implementations, the AI architecture can be configured to receive a digital document as an input, process the digital document, and generate an output indicating whether or not the digital document was manipulated. For example, the AI architecture can receive the digital document in a Portable Document Format (PDF). In some implementations, the AI architecture can include a graph feature extraction system, a vector generator, and a trained machine-learning model. The graph feature extraction system can define a bounding box for each character included in the digital document using an Optical Character Recognition (OCR) technique. For example, a character can be any American Standard Code for Information Interchange (ASCII) character. Additionally, the graph feature extraction system can generate a graph for each bounding box surrounding a character included in the digital document. Each graph can include a set of nodes, including a central node representing the character being evaluated for manipulation and N nodes on each side of the central node (e.g., for a total of 2N+1 nodes). The graph feature extraction system can generate a set of features for each node in the graph. Non-limiting examples of features can include approximate width and height of the character included in a bounding box, the y-axis displacement between the node and another node in the graph, the distance between the node and another node in the graph, the Hu moments associated with the node, and the principal inertia axis associated with the node.

As an illustrative example, the N value can be three, and the digital document can include the word "Parkway." The graph feature extraction system can generate an individual graph for each character in the word "Parkway." When the AI architecture evaluates the character "k" in the word "Parkway" for manipulation, the graph can include a central node representing the character "k" and a node for each of the three (e.g., N) characters to the right of the character "k" and for each of the three characters to the left of the letter "k" for a total of seven nodes. The graph feature extraction system can generate a set of features associated with the character "k," for example, an approximate width and height of the character "k," a y-axis displacement between the bounding box containing the character "k" and each remaining node in the graph, the Hu moments associated with the character "k," and so on. The set of features for each node can be represented by one or more vectors.

The vector generator can generate a single vector representation of the graph. For example, each of the features for each node of a given graph can be concatenated into a single vector representation to numerically represent the graph for each character. Vector combination techniques other than concatenation can be used. The trained machine-learning model can receive the vector representation for the graph associated with a character and generate an output classifying the character as manipulated or not manipulated. In some implementations, the trained machine-learning model can be a decision tree model (e.g., a random forest model), which has been trained to compare the input vector representation of a graph with the graphs of other characters (both manipulated and not manipulated) of other digital documents used to train the random forest model. In other implementations, the trained machine-learning model can be a graph neural network, which has been trained using the graphs of other characters in a training set of digital documents. The present disclosure is not limited to the implementations described above, and thus, any suitable machine-learning model can be used to classify characters as manipulated or not manipulated.

To train the machine-learning model, a training set of digital documents can be collected. The graph feature extraction system can process each digital document in the training set by generating a vector representation of the graph for each character included in each digital document. Certain characters in the digital documents of the training set can be intentionally manipulated (e.g., scaled or shifted). Each vector representation can be labeled to indicate whether or not the character corresponding to the graph was manipulated. For example, the vector representation of each graph in the training set can be labeled with a "1" or "0." A "1" can indicate that the character was manipulated, and a "0" can indicate that the character was not manipulated. The labeled vector representations can be used to train a random forest model.

As an illustrative example, the AI architecture can be executed to process a digital document received from a user device. The user device can transmit a request to a network including the AI architecture. The request can represent a request to initiate an obligation (e.g., a loan) for a user operating the user device. The AI architecture can be executed to process the digital document provided by the user device. For example, the AI architecture can verify the information contained in the digital document by initially detecting whether or not any characters contained in the digital document have been manipulated. The AI architecture can then trigger a workflow for processing the request. The workflow can be selected based on whether or not the AI architecture detected any manipulated characters.

To further improve the functioning of computer systems, the AI architecture can provide a technical solution to the technical challenges that arise out of detecting imperfections in digital documents without color or texture. For instance, the AI architecture provides a graph-based comparison of characters and an ensembled decision tree model to detect imperfections due to, for example, shifted or scaled characters in a manipulated document. The graph-based comparison of characters improves the detection of manipulated characters in digital documents by comparing a character with neighboring characters.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

Figure 1:
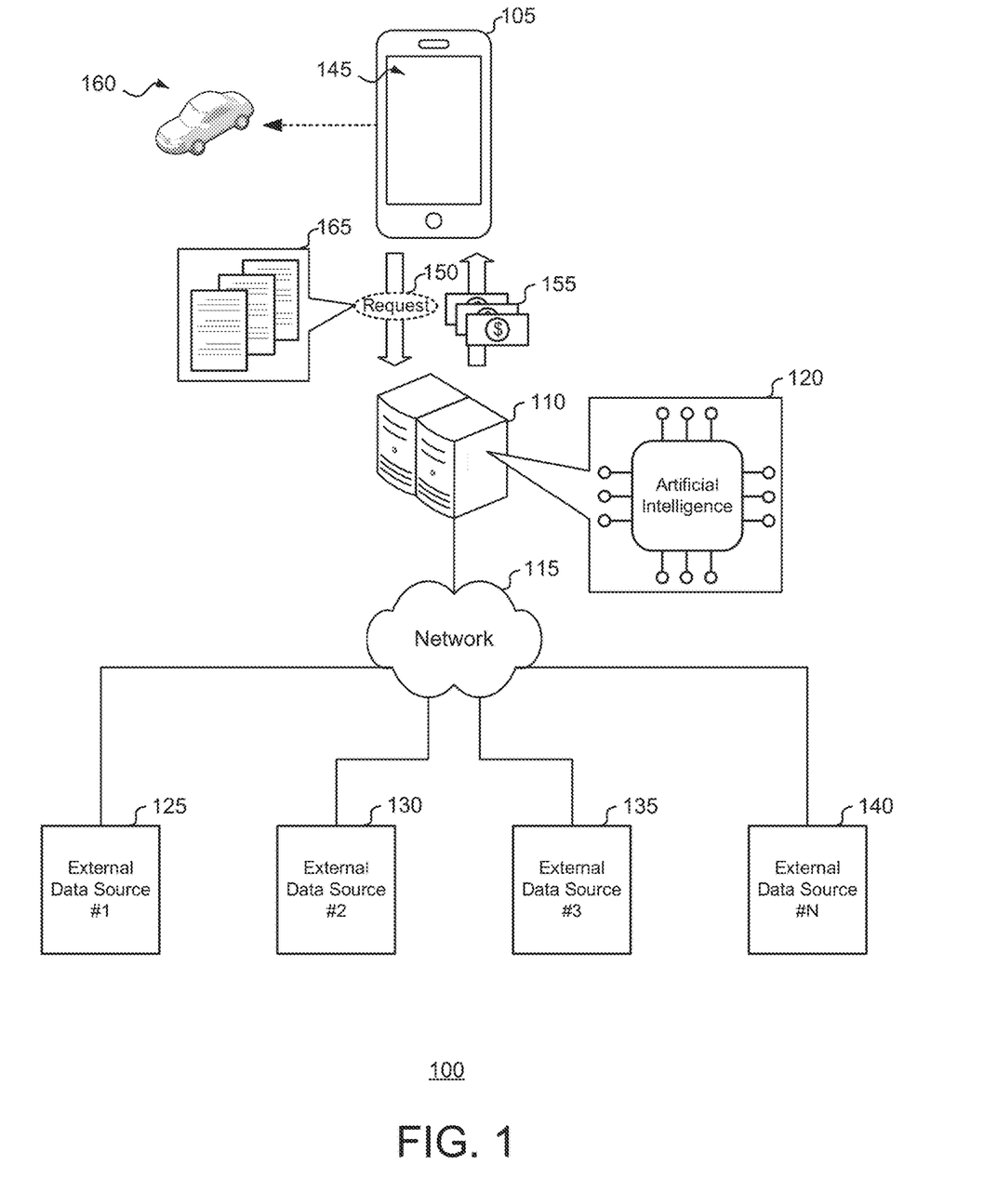
FIG. 1 is a block diagram illustrating an example of a network architecture of a behavior prediction system, according to certain aspects of the present disclosure.

FIG. 1 is a block diagram illustrating an example of a network architecture 100 of a behavior prediction system 110, according to certain aspects of the present disclosure. Network architecture 100 can be configured to facilitate digital communications between a user device 105, the behavior prediction system 110, and external data sources (e.g., any one or more of external data source 125 through external data source 140).

The user device 105 can be any portable (e.g., smartphone, tablet computing device, laptop, etc.) or non-portable (e.g., electronic kiosk, desktop computer, etc.) computing device operated by a user or by another individual on behalf of the user. While the network architecture 100, as illustrated in FIG. 1, includes a single user device 105, the network architecture 100 can include any number of user devices. The user device 105 can communicate with the behavior prediction system 110 by executing a native application 145 or by accessing a web server (not shown) that hosts a website operated by the behavior prediction system 110.

The behavior prediction system 110 can include a network of one or more servers and databases. The network within the behavior prediction system 110 can include a web server that hosts one or more webpages or an application server that hosts the native application 145. For example, the user device 105 can interact with the behavior prediction system 110 by transmitting a communication to the application server of the behavior prediction system 110 using the native application 145 executing on the user device 105.

The network 115 can be any type of network that facilitates digital communications between computing devices, using any of a variety of commercially-available protocols, including without limitation TCP/IP (transmission control protocol/Internet protocol), SNA (systems network architecture), IPX (Internet packet exchange), AppleTalk, and the like. In some implementations, the network 115 can be a cloud-based network. In other implementations, the network 115 can be an on-premises network associated with an enterprise. The network 115 can be a local area network (LAN), such as one based on Ethernet, Token-Ring and/or the like. Alternatively, the network 115 can be a wide-area network and the Internet, such as a virtual network, a virtual private network (VPN), an intranet, an extranet, a public switched telephone network (PSTN), an infra-red network, a wireless network, or any other suitable network or combination thereof.

Each external data source 125 through 140 can include one or more databases that store structured or unstructured user data that characterizes any aspect of the specific user operating the user device 105. Each external data source 125 through 140 can be any of a private database or a public database. For example, the external data source 125 can be a private database operated by a bank that stores an electronic document, such as a bank statement that characterizes transactions made by the user. As another example, the external data source 130 can be a publicly accessible database that stores a set of statistics or descriptions of various occupations (e.g., the public database provided by the Bureau of Labor Statistics). The external data sources 125 through 140 can be operated by any third-party entity, such as a private enterprise or a government entity.

Any combination of the computing devices illustrated in the network architecture 100 can communicate with each other. As an illustrative example, the user device 105 can be operated by a user to transmit a request 150 for initiating an obligation for a car 160. For example, the request 150 can include one or more digital documents 165 (e.g., PDF documents), such as a pay-stub or other evidence of income, provided by the user. In response to receiving the request 150, the behavior prediction system 110 can process the request 150 using an AI architecture 120 to generate a response 155 to the request 150. The response 155 can represent an approval or denial of the request 150 to initiate the obligation. If the response 155 is an approval, the behavior prediction system 110 can facilitate the disbursement of funds to the user.

Before processing the request 150 or as part of processing the request 150, the AI architecture 120 can detect whether the one or more digital documents provided by the user were digitally manipulated. As an illustrative example, if the digital document is an income statement that was digitally manipulated to increase the income value listed on the document, the AI architecture 120 can automatically detect this digital manipulation. If the AI architecture 120 detects digital manipulation on the one or more documents provided by the user, the behavior prediction system 110 can deny the request 150 or perform another workflow (e.g., requesting additional documentation from the user).

If the AI architecture 120 does not detect any digital manipulation on the one or more digital documents provided by the user, then the behavior prediction system 110 can continue to process the request 150. The behavior prediction system 110 can access any one or more of the external data sources 125 through 140 to retrieve any structured or unstructured user data associated with the user. The structured or unstructured user data can characterize any aspect of the user. The behavior prediction system 110 can input the retrieved structured or unstructured user data into the AI architecture 120 to generate a user parameter. The user parameter can represent a predicted probability of a future behavior of the user with respect to the specific obligation requested in request 150 (or any obligation generally). The predicted probability of the future behavior of the user can be represented by any value (e.g., a score) that is an indication of a degree to which the user is predicted to satisfy the specific or to not satisfy the obligation (or any obligation generally). The components of the behavior prediction system 110 are described with respect to FIG. 2. The present disclosure is not limited to the obligation being a loan. Any type of obligation can be requested (e.g., legal obligation, student loan, mortgage, etc.).

Figure 2:
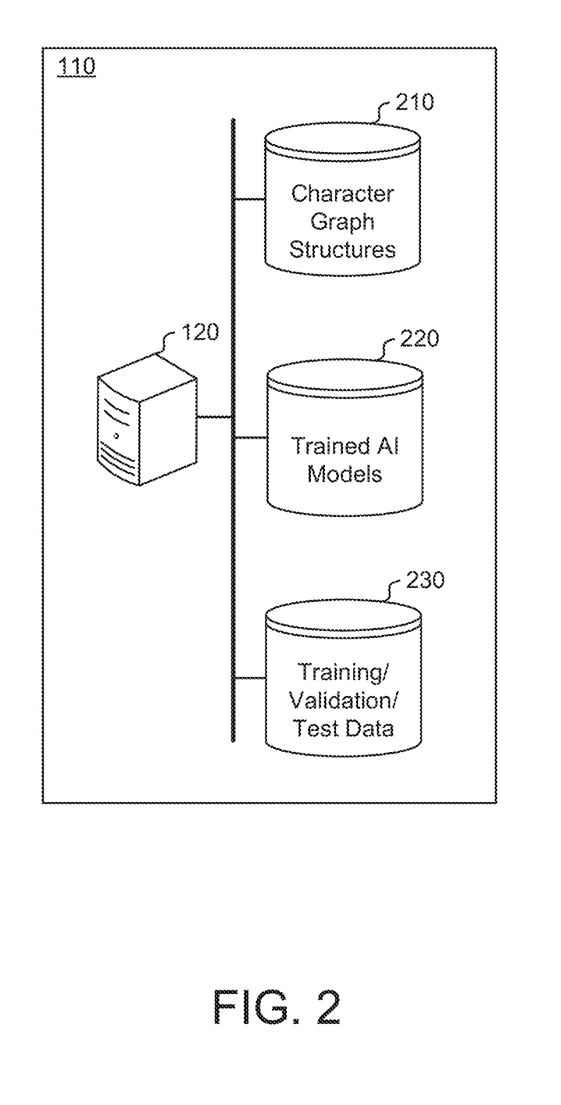
FIG. 2 is a block diagram illustrating an example of an AI architecture, according to certain aspects of the present disclosure.

FIG. 2 is a block diagram illustrating an example of the behavior prediction system 110, according to certain aspects of the present disclosure. In some implementations, the behavior prediction system 110 includes the AI architecture 120, a database 210 storing character graph structures, a database 220 storing trained AI models, and a database 230 storing training data, validation data, or test data for any of the trained AI models stored in database 220.

The database 210 can be a data structure configured to store the graph for each character included in a set of digital documents. For example, the graphs for the characters included in digital documents provided by users who previously transmitted requests to the behavior prediction system 110 can be stored in database 210. The database 210 can also store the set of features generated for each node in a given graph. The database 210 can also store the vector representation for each graph associated with the set of digital documents.

The database 220 can store the source code that is executed to train the various AI models included in the AI architecture 120. For example, the source code can also include the model artifact that is created in response to the training process, including, for example, hyperparameters (e.g., a number of layers), learnt parameters (e.g., feature weights or activation function outputs, etc.), or any other aspect that defines a machine-learning model.

In some implementations, the database 220 can store the source code that is used to execute the AI architecture 120. As an illustrative example, the database 220 can store the Python source code that executes the trained random forest model used to classify a character as manipulated or not manipulated. The database 220 can also store the various parameters associated with the random forest model. Training the random forest model can include performing a randomized hyper-parameter search for a set of iterations. Training the random forest model can also include performing a five-fold cross-validation on the training data set stored in database 230. The average performance and the standard deviation of the five folds cross-validation can be used as parameters for the random forest model.

The database 230 can store the training data, the validation data, and the test data for the AI architecture 120. The training data can include one or more digital documents that include one or more characters. The validation data can be used to validate the trained models. The test data can be used as an evaluation of the final trained model. The database 230 can also store any structured or unstructured user data retrieved from any external data source.

In some implementations, the training data can include a set of digital documents, including, for example, bank statements, offer letters, credit card statements, bills, or tax returns. The set of digital documents can be segmented, such that a portion of the set of documents is used as training data and the remaining portion is used as validation data or test data. Each digital document can contain one or more pages.

As an illustrative example, a digital document can be an original PDF document. The AI architecture can perform OCR on the original PDF document to generate and store the bounding boxes surrounding each character. The PDF can be converted to an image, and as the AI architecture 120 iterates through the character bounding boxes included in the digital document, the AI architecture 120 can alter a bounding box included in the image by shifting or scaling the bounding box with a certain probability (e.g., a probability of 0.05). For example, scaling or shifting can be applied stochastically within four ranges of values: shifting one to five pixels, shifting five to 10 pixels, scaling seven percent to 14 percent, and scaling 15 percent to 25 percent. If the bounding box has been altered, the AI architecture can store the coordinates of the altered bounding box in the image for later use as a ground truth. The resulting dataset can be a collection of PNG images of documents of which five percent of the characters have been altered through scaling or shifting certain character bounding boxes in the original PDF document.

Figure 3:
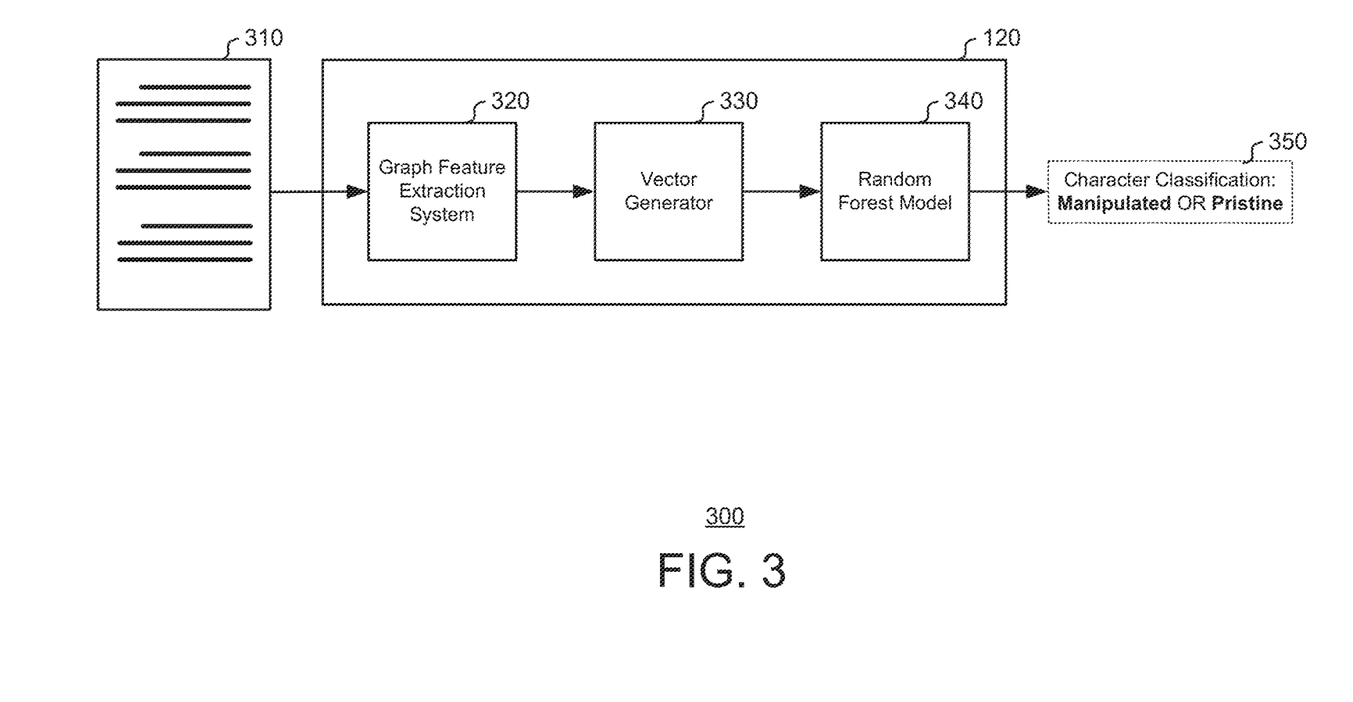
FIG. 3 is a block diagram illustrating an example of a workflow for detecting manipulation on a digital document using the AI architecture, according to certain aspects of the present disclosure.

FIG. 3 is a block diagram illustrating an example of a workflow 300 for detecting manipulation on a digital document using the AI architecture 120, according to certain aspects of the present disclosure. As part of the workflow 300, the AI architecture 120 can receive a digital document 310, process the digital document 310, and generate a classification for one or more characters included in the digital document 310 based on a result of processing the digital document 310. For example, the AI architecture can classify a character as manipulated or not manipulated. The digital document 310 can be provided by a user in association with a request to initial an obligation. The digital document 310 can be in any format and can include any number or type of characters or may not include any characters at all. The digital document 310 can include any number of pages. As an illustrative example, the digital document 310 can be a PDF version of the user's bank statement.

In some implementations, the AI architecture 120 can be configured to include several components, including a graph feature extraction system 320, a vector generator 330, and a trained random forest model 340. Each component of the AI architecture 120 can be implemented by executing code by one or more processors. The graph feature extraction system 320 can transform the digital document 310 into machine-readable text. For example, the graph feature extraction system can extract a bounding box for each character included in the digital document 310 using an OCR technique.

Additionally, the graph feature extraction system 320 can generate a graph for each bounding box surrounding a character included in the digital document 310. A graph can include a set of nodes. The set of nodes can include a central node representing the character corresponding to the graph and N surrounding nodes on each side of the central node (e.g., for a total of 2N+1 nodes). Each of the N surrounding nodes can correspond to a bounding box containing a character. The N value can be any number. For a given central node in a graph, each surrounding node can be associated with a character that is on the same line of text as the character associated with the central node. The graph feature extraction system 320 can be configured to measure the difference in the y-values of each node in comparison with the heights. In some examples, when the difference between the y-values of the top of two character bounding boxes is less than 0.85 of the height of the taller bounding box, then the graph feature extraction system 320 can identify the bounding boxes as being on the same line of text. For example, the graph feature extraction system 320 can determine that two character bounding boxes (e.g., each bounding box corresponding to a node in a graph) are on the same line of text using Equation (1) below.

$$|y0_{n1}-y0_{n2}|<(0.85 \times \max(height_{n1}, height_{n2})),$$

$y0_n$ indicates the y-value of node n and $height_n$ represents the height of node n. When the central node falls near the left or right end of a line, the surrounding nodes to the left or right of the central node may not include a character. To address this, the graph feature extraction system 320 can impute the missing characters with the characters from the opposite side of the central node. For example, if the central node is the first character on the left side of a line of text, there would be no characters to include in the left side N surrounding nodes. The graph feature extraction system 320 can impute the missing characters with the N characters included on the end of the right side of the line of text.

The graph feature extraction system can generate a set of features for each node in a graph. Non-limiting examples of features can include approximate width and height of the character included in a bounding box, the y-axis displacement between the node and another node in the graph, the distance between the node and another node in the graph, the Hu moments associated with the node, and the principal inertia axis associated with the node.

As an illustrative example, the N value can be three, and the digital document can include the phrase "Parkway Avenue is the location," which is the only text in a line of text. For the character "P" in the word "Parkway," the graph can include a central node representing the character "P"; a right side surrounding node for each of the characters "a", "r", and "k"; and a left side surrounding node for each of the characters on the right end of that line of text. For example, the left side surrounding nodes can include a node for "i", "o", and "n", which are the three characters on the right side end of that line of text within the word "location."

The graph feature extraction system 320 can generate a set of features for each node in each graph that is associated with the digital document 310. Each feature can be represented in a numerical form, such as a vector representation. Non-limiting examples of features can include approximate width and height of the character included in a bounding box, the y-axis displacement between the node and another node in the graph, the distance between the node and another node in the graph, the Hu moments associated with the node, and the principal inertia axis associated with the node.

The vector generator 330 can combine the set of features generated for each node of a graph into a single vector representation that numerically represents the graph of a given character. In some implementations, the vector generator 330 can concatenate the set of features of each node into a node vector representation, and then concatenate the resulting node vector representations of the various nodes in the graph into a single vector representation that represents the entire graph. Thus, the output of the vector generator 330 can be a single vector representation corresponding to a single character in the digital document 310.

The random forest model 340 can be trained to classify the vector representations of characters as manipulated or not manipulated. The random forest model 340 can receive the vector representation of the graph corresponding to a character. The random forest model 340 can evaluate the received vector representation using the labeled vector representations (e.g., labeled with a "1" for each graph of a manipulated character, and "0" for each graph that was not manipulated). As an output 350, the random forest model 340 can generate a classification of the inputted vector representation based on the evaluation. Any classification categories can be used, however, as an example, the random forest model 340 can classify a vector representation of a graph corresponding to a character as "manipulated" or "pristine" (e.g., not manipulated).

Figure 4:
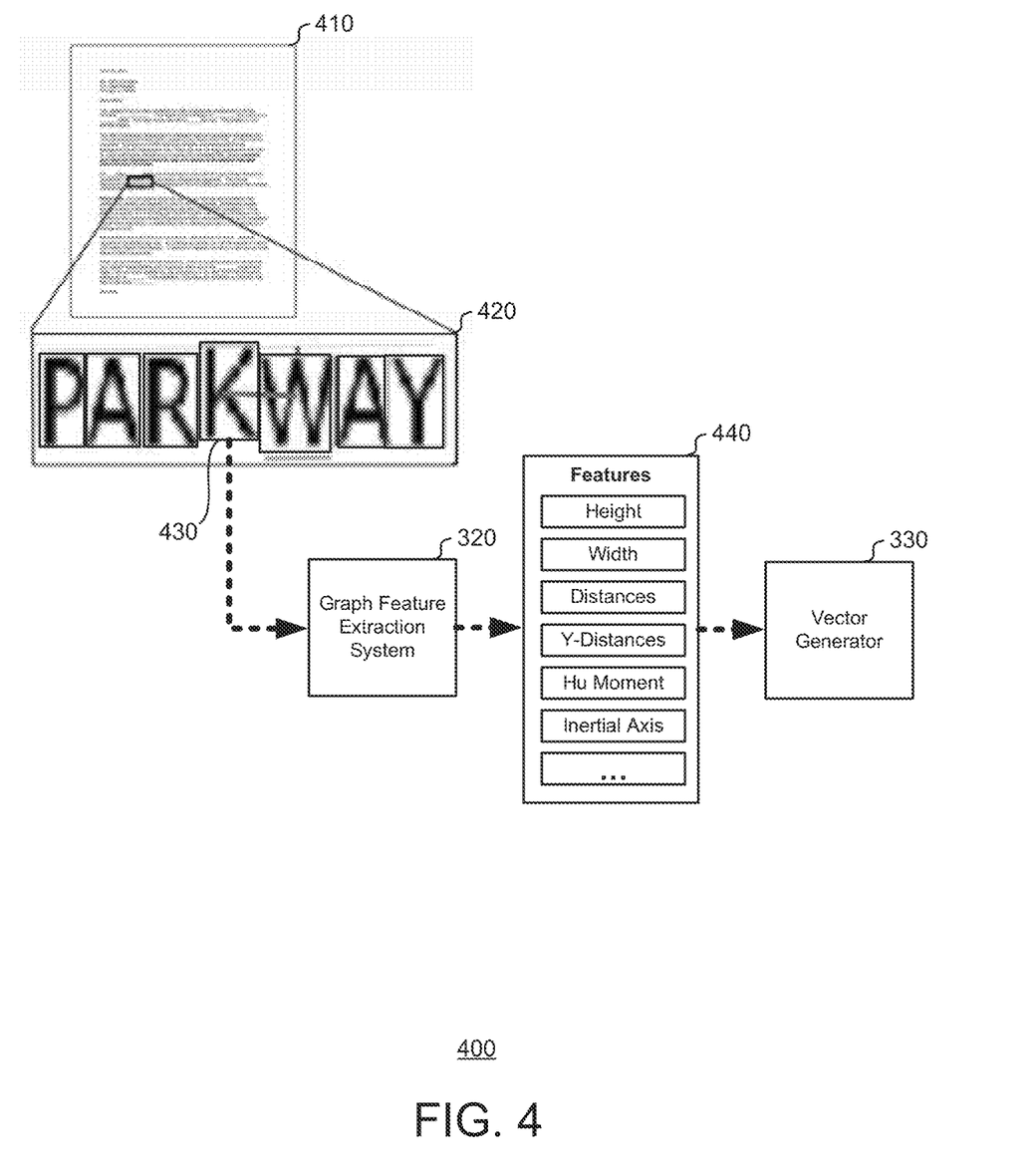
FIG. 4 is a diagram illustrating another example of a workflow for detecting manipulation on a digital document using the AI architecture, according to certain aspects of the present disclosure.

FIG. 4 is a diagram illustrating another example of a workflow 400 for detecting manipulation on a digital document 410 using the AI architecture, according to certain aspects of the present disclosure. In the example illustrated in FIG. 4, the digital document 410 can be a letter including a word 420, such as "PARKWAY." A forger previously manipulated the digital document 410, however, due to imperfections in the manipulation, the character "K" is slightly offset from the other characters in an upward direction. As part of workflow 400, the digital document 410 can be inputted into the graph feature extraction system 320 to generate a graph for each character included in the digital document 410. For example, the graph feature extraction system 320 can define a bounding box for each character (e.g., bounding box 430 surrounds the character "K"). The graph feature extraction system 320 can iterate through each bounding box to generate a graph representing the character contained in the bounding box.

The graph feature extraction system 320 generates a set of features for each node included in the graph. Using the character "K" as an example, the graph feature extraction system 320 evaluates the bounding box 430 and the character "K" contained inside the bounding box 430 to generate a set of features 440. Non-limiting examples of features can include approximate width and height of the character included in a bounding box, the y-axis displacement between the node and another node in the graph, the distance between the node and another node in the graph, the Hu moments associated with the node, and the principal inertia axis associated with the node.

For the height and width features, the graph feature extraction system 320 generates an approximation of the height and width of the character "K" using dimensions of the bounding box 430. If a given character has been manipulated, imperfections in the manipulation often manifest in a slight character size difference.

For the y-value difference feature, the graph feature extraction system 320 can compute a displacement of adjacent bounding boxes along the y-axis. For example, the graph feature extraction system 320 can set the uppermost y-value of the bounding box of the central node as 0 (e.g., in this case, the top of bounding box 430), and compute the positive or negative difference of the neighboring bounding box y-values with respect to the central node. In some implementations, the top of the bounding box may be used as the point of reference for calculating a y-value. Any reference point (e.g., center, bottom, etc.) of a bounding box can be used to calculate the y-value of the bounding box.

For the distance feature, the graph feature extraction system 320 can determine the Euclidean distance from the center of the bounding box of each surrounding node to the center of the bounding box of the central node. For example, the distance between the character "K" and the character "W" can be determined by calculating the Euclidean distance between the center of bounding box 430 to the center of the bounding box containing the character "W". The graph feature extraction system 320 can use Equation (2) below to calculate the Euclidean distance between two bounding boxes.

$$d((x_1,y_1),(x_2,y_2)) = \sqrt{(x_1-x_2)^2+(y_1-y_2)^2}$$

where $(x_1, y_1)$, $(x_2, y_2)$ can refer to the center of the bounding box for the central node and the center of a bounding box for a neighboring surrounding node, respectively.

For the Hu moments features, the graph feature extraction system 320 can determine the seven Hu moments. The seven Hu moments can be defined using Equation (3) through Equation (9) below.

$$\varphi_1 = \eta_{20}+\eta_{02}, \qquad \text{Equation (3)}$$

$$\varphi_2 = (\eta_{20}+\eta_{02})^2+4\eta_{11}^2, \qquad \text{Equation (4)}$$

$$\varphi_3 = (\eta_{30}+3\eta_{12})^2+(3\eta_{21}+\mu_{03})^2, \qquad \text{Equation (5)}$$

$$\varphi_4 = (\eta_{30}+\eta_{12})^2+(\eta_{21}-\mu_{03})^2, \qquad \text{Equation (6)}$$

$$\varphi_5 = (\eta_{30}+3\eta_{12})(\eta_{30}+\eta_{12})[(\eta_{30}+\eta_{12})^2-3(\eta_{21}+\eta_{03})^2]+ \\ (3\eta_{21}-\eta_{03})(\eta_{21}+\eta_{03})[3(\eta_{30}+\eta_{12})^2-(\eta_{21}+\eta_{03})^2], \qquad \text{Equation (7)}$$

$$\varphi_6 = (\eta_{20}-\eta_{02})[(\eta_{30}+\eta_{12})^2-(\eta_{21}+\eta_{03})^2]+4\eta_{11}(\eta_{30}+\eta_{12})(\eta_{21}+\eta_{03}), \qquad \text{Equation (8)}$$

$$\varphi_7 = (3\eta_{21}-\eta_{03})(\eta_{30}+\eta_{12})[(\eta_{30}+\eta_{12})^2-3(\eta_{21}+\eta_{03})^2]- \\ (\eta_{30}-3\eta_{12})(\eta_{21}+\eta_{03})[3(\eta_{30}+\eta_{12})^2-(\eta_{21}+\eta_{03})^2], \qquad \text{Equation (9)}$$

where each normalized centroid moment $\eta_{pq}$ is defined using Equation (10) below.

$$\eta_{pq} = \frac{\mu_{pq}}{\mu_{00}^\gamma}, \gamma = (p+q+2)/2, p+q = 2, 3, \ldots \qquad \text{Equation (10)}$$

where each centroid moment $\mu_{pq}$ is defined using Equation (11) below.

$$\mu_{p,q} = \int_{-\infty}^{\infty}\int_{-\infty}^{\infty}(x-\bar{x})^p(y-\bar{y})^q f(x,y)dx\,dy \qquad \text{Equation (11)}$$

where the pixel point (x, y) is the centroid of the PDF image or the centroid of the character bounding box.

For the feature representing the principal inertia axis, the graph feature extraction system 320 can execute a singular value decomposition (SVD) model using the $\mu_{20}$, $\mu_{11}$, and $\mu_{02}$ Hu moments.

Each feature of the set of features 440 can be represented in numerical form, such as a vector representation. The vector generator 330 can combine the various vectors of the set of features 440 for each node of a graph to generate a single vector representation to numerically represent the graph.

Figure 5:
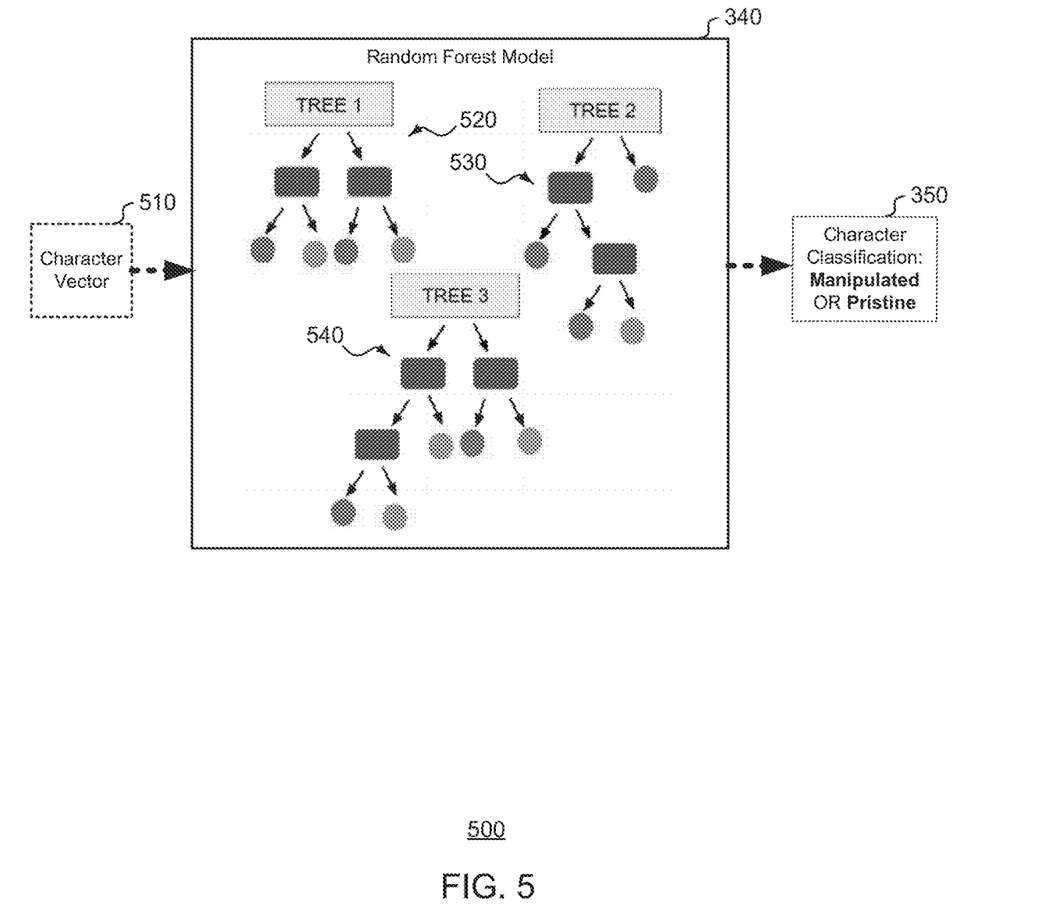
FIG. 5 is a diagram illustrating yet another example of a workflow for detecting manipulation on a digital document using the AI architecture, according to certain aspects of the present disclosure.

FIG. 5 is a diagram illustrating yet another example of a workflow 500 for detecting manipulation on the digital document 410 using the AI architecture 120, according to certain aspects of the present disclosure. Continuing with the example illustrated in FIG. 4, the vector generator 330 can generate a character vector 510, which is a vector representation of the graph of a specific character, such as the character "K" illustrated in FIG. 4.

The character vector 510 can be inputted into the random forest model 340. The random forest model 340 can include any number of decision trees, such as decision tree 520, decision tree 530, and decision tree 540. Each decision tree 520, 530, and 540 can classify a given vector representation of a graph. The random forest model 340 can ensemble the classifications of the various decision trees and determine a final classification, for example, the output 350 classifying the character represented by the character vector 510 as a manipulated character or as a pristine character (e.g., not manipulated).

A random forest model, for example, can reduce variance by generating multiple decision trees, bootstrapping training samples, and randomly subsetting features considered for splitting or branching. Ensembling a group of decision trees can provide technical advantages for dealing with large feature spaces, outliers, and mixed-data types. Additionally, ensemble decision trees may take into account interactions between different input features without explicit feature engineering. Any tree ensembling model can be used (e.g., bagging, gradient boasting, etc.) and may provide technical advantages over single-tree models in some cases, such as decreasing the overall model variance to prevent overfitting. As an illustrative example, the random forest model 340 can be configured to perform a random search on a range of values, and the hyper-parameters can be tuned for a total of 480 iterations.

Figure 6:
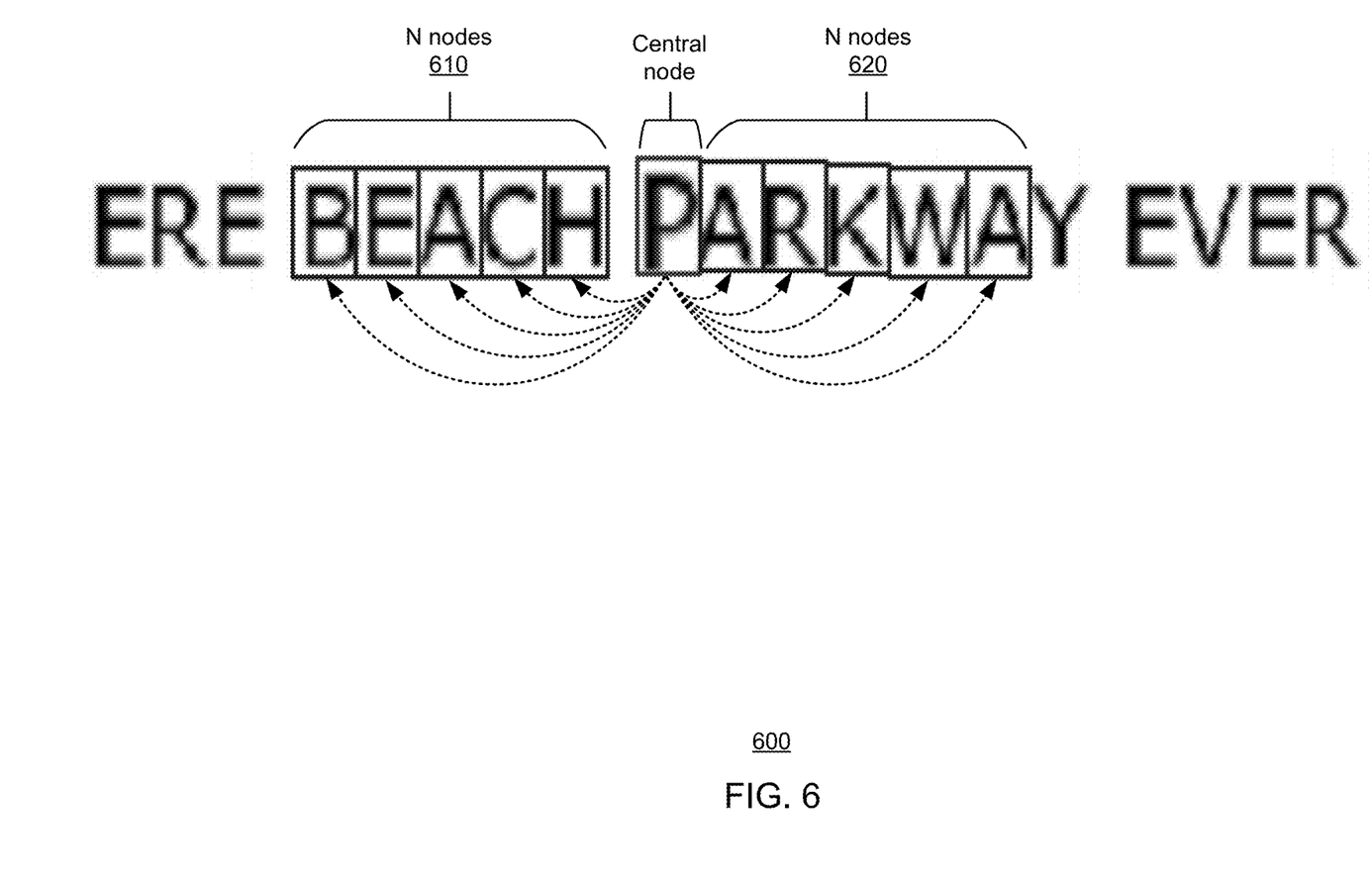
FIG. 6 is a diagram illustrating an example of a graph of nodes representing a specific character included in a digital document, according to certain aspects of the present disclosure.

FIG. 6 is a diagram illustrating an example of a graph 600 of nodes representing a specific character included in a digital document, according to certain aspects of the present disclosure. As illustrated in FIG. 6, the graph 600 can be a graph representing the character "P" because the character "P" is selected as the central node in the graph 600. Further, the graph 600 has an N value of five because there are five nodes to the left of the central node and another five nodes to the right of the central node. Additionally, the graph feature extraction system 320 can generate a graph, such as graph 600, for each character included in a digital document. Each character in the digital document can serve as a central node of a graph.

Each node of the N nodes 610 is represented by a bounding box that surrounds a character. Each character "B," "E," "A," "C," and "H" is a node in the graph 600 and is surrounded by a bounding box. The graph feature extraction system 320 can generate a set of features for each node of the N nodes 610 in the graph 600. Non-limiting examples of features can include approximate width and height of the character included in a bounding box, the y-axis displacement between the node and another node in the graph, the distance between the node and another node in the graph, the Hu moments associated with the node, and the principal inertia axis associated with the node. For a given node in the graph 600, the corresponding bounding box can be used to generate one or more features of the set of features. For example, a feature can indicate a y-value difference between the central node and another node (e.g., the node represented by the bounding box surrounding the character "B"). The y-value difference can be determined by calculating a difference between the top of the bounding box associated with the central node and the top of the bounding box associated with the other node. Similarly, each node of the N nodes 620 is represented by a bounding box that surrounds a character. Each character "A," "R," "K," "W," and "A" is a node in the graph 600 and is surrounded by a bounding box. The graph feature extraction system 320 can generate a set of features for each node of the N nodes 620 in the graph 600.

Figure 7:
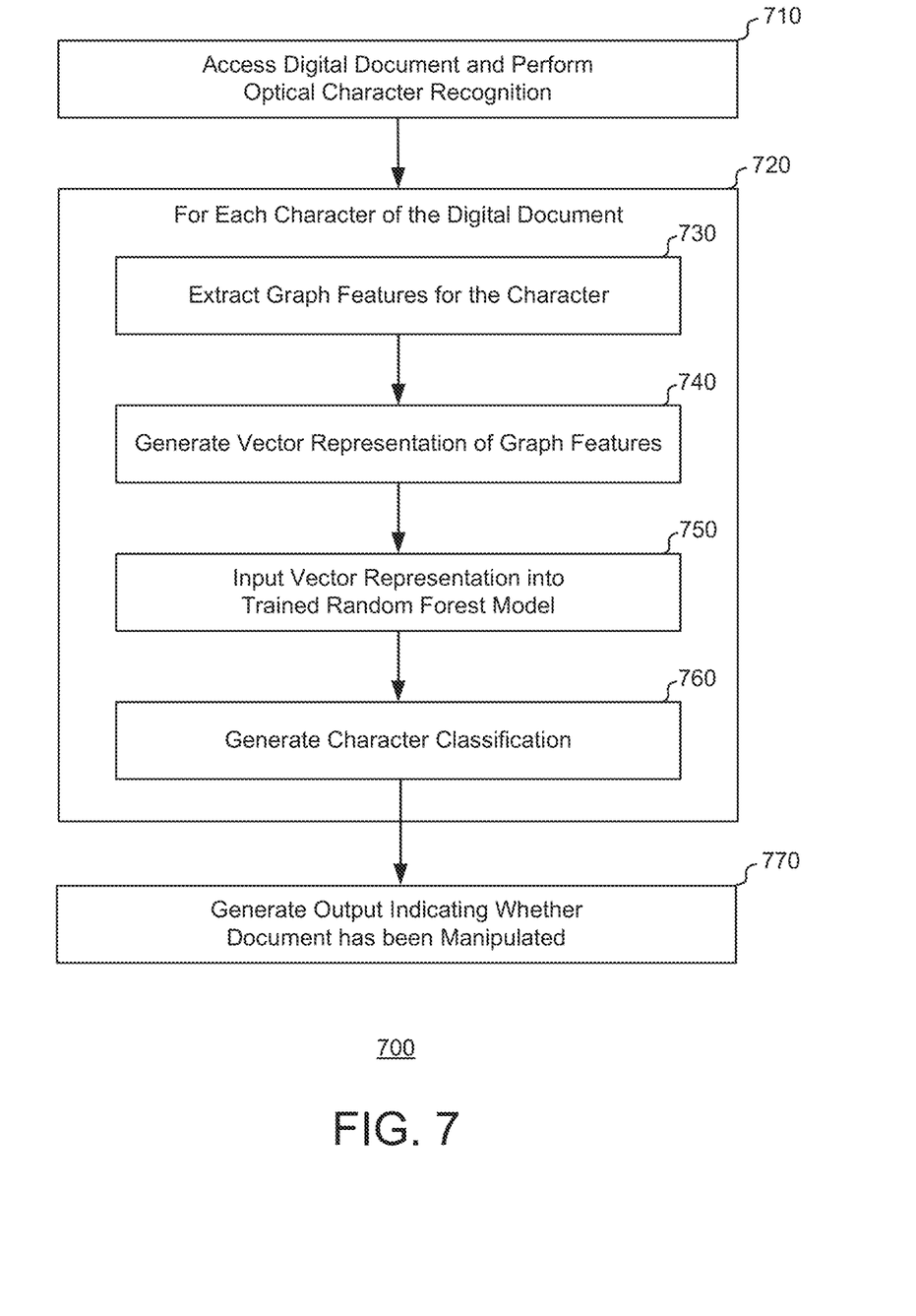
FIG. 7 is a flow diagram illustrating an example of a process for detecting manipulation in a digital document, according to certain aspects of the present disclosure.

FIG. 7 is a flow diagram illustrating an example of a process for detecting manipulation in a digital document, according to certain aspects of the present disclosure. The process 700 can be performed by any of the hardware-based components described with respect to FIGS. 1-3. For example, the AI architecture 120 can perform the process 700 in response to receiving a request to initiate an obligation from a user device operated by a user. The request can include or be associated with one or more digital documents provided by the user. The output of performing the process 700 can include a classification of the one or more digital documents as digitally manipulated or pristine (e.g., original and not digitally manipulated). If the output of performing the process 700 indicates that the one or more digital documents have been manipulated, then the behavior prediction system 110 can generate a response denying the request to initiate the obligation. If, however, the output of performing the process 700 indicates that the one or more digital documents have not been manipulated, then the behavior prediction system 110 can further evaluate the response and the one or more digital documents to determine whether to approve or deny the request.

Process 700 begins at block 710, where the AI architecture 120 can access one or more digital documents. For example, a digital document can be a PDF version of a bank statement uploaded to the behavior prediction system 110 by a user operating a native or web application. The one or more digital documents can be in any format, such as .doc, .pdf, .csv, .png, and other suitable file formats. The characters included in the one or more digital documents may not yet be machine-readable due to the format of the digital documents. Accordingly, the AI architecture 120 can perform one or more optical character recognition (OCR) techniques on each digital document of the one or more digital documents to extract the characters included in the documents. For example, the OCR techniques can detect each character included in a digital document and define a bounding box to surround each detected character.

At block 720, for each character detected in the one or more digital documents, the AI architecture 120 can perform blocks 730, 740, 750, and 760. At block 730, the AI architecture 120 can extract graph features for the character by, for example, generating a graph of nodes to represent the character and generating a set of features for each node included in each graph. The graph of nodes can include a central node, N nodes to the left of the central node, and another N nodes to the right of the central node. The central node can correspond to a given character in a line of text. Each of the N nodes surrounding the central node can correspond to a character in the same line of text as the character corresponding to the central node. Non-limiting examples of features can include approximate width and height of the character included in a bounding box, the y-axis displacement between the node and another node in the graph, the distance between the node and another node in the graph, the Hu moments associated with the node, and the principal inertia axis associated with the node. Each graph feature can be represented numerically, such as by a vector.

At block 740, the AI architecture 120 can generate a vector representation for the graph features extracted at block 730. For example, the vector generator 330 of the AI architecture 120 can concatenate the set of features generated for each node into a single vector representation that represents an entire graph associated with the character. Any technique for combining vector representations can be used, and thus, the present disclosure is not limited to concatenation.

At block 750, the AI architecture 120 can input the vector representation of the graph associated with the character into the random forest model 340. The random forest model 340 can be trained to generate a classification of the character as manipulated or not manipulated. Any single decision tree or ensembled decision tree model can be used, and thus, the present disclosure is not limited to a random forest model.

At block 760, the AI architecture 120 can generate an output that represents a character classification. Any suitable categories can be used for the character classification, including, but not limited to, digitally manipulated, pristine, suspected digital manipulation, or anomaly detected. The output at block 760 can be a classification of an individual character included in a digital document.

At block 770, the behavior prediction system 110 can evaluate the various classifications of the characters included in the one or more digital documents to determine whether or not a document has been manipulated. In some implementations, if a single character is classified as manipulated, then at block 770 the entire set of one or more digital documents can be treated as if they were manipulated. In other implementations, if the number of characters that are classified as manipulated is equal to or above a threshold number, then the behavior prediction system 110 can deny the request received from the user. If, however, the number of characters that are classified as manipulated is below the threshold number, then the behavior prediction system 110 can continue to process or evaluate the request from the user. In this example, the behavior prediction system 110 can treat the characters that are classified as manipulated as anomalous, but not digitally manipulated (e.g., apparently manipulated due to low quality printing or scanning).

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

What is claimed is:

1. A computer-implemented method, comprising:
   accessing a digital document that includes a plurality of characters;
   defining a bounding box surrounding each character of the plurality of characters; and
   executing a workflow for detecting a manipulated character in the digital document, the workflow including:
   generating a graph representing a character of the plurality of characters, the graph including a set of nodes, and each node of the set of nodes corresponding to one of the bounding boxes defined in the digital document;
   extracting one or more features for each node of the set of nodes of the graph;
   combining the one or more features for each node of the set of nodes of the graph into a single vector representation;
   inputting the single vector representation of the graph into a trained machine-learning model; and
   determining, based on an output of the trained machine-learning model, a classification of the character as manipulated or not manipulated.

2. The computer-implemented method of claim 1, wherein generating the graph representing the character further comprises:
   defining a central node of the set of nodes of the graph, the central node corresponding to a bounding box surrounding the character; and
   defining a plurality of neighboring nodes of the set of nodes of the graph, each neighboring node of the plurality of neighboring nodes corresponding to a bounding box surrounding another character of the plurality of characters.

3. The computer-implemented method of claim 1, wherein generating the graph representing the character further comprises:
   identifying a first y-axis value of a first bounding box in the digital document, the first bounding box surrounding the character;
   identifying a second y-axis value of a second bounding box surrounding another character of the plurality of characters;
   comparing the first y-axis value and the second y-axis value; and
   determining that the first bounding box and the second bounding box are located on a same line of characters based on a result of the comparison.

4. The computer-implemented method of claim 1, wherein extracting the one or more features for each node of the set of nodes of the graph further comprises:
   determining the one or more features of a given node, wherein each feature of the one or more features of the given node is determined by executing one or more techniques from amongst a plurality of techniques, and the plurality of techniques including:
   a first technique for determining a height or width of the character based on a height or width of the bounding box surrounding the character;
   a second technique for determining a y-value difference between the bounding box surrounding the character and a bounding box surrounding another character;
   a third technique for determining a distance between the bounding box surrounding the character and the bounding box surrounding the other character;
   a fourth technique for determining one or more Hu moments of the character contained within the bounding box; and
   a fifth technique for determining a principal inertia axis associated with the bounding box surrounding the character.

5. The computer-implemented method of claim 4, wherein determining the one or more features for the given node further comprises:
  determining the principal inertia axis by inputting at least Hu moment of the one or more Hu moments into a singular value decomposition (SVD) model.

6. The computer-implemented method of claim 1, wherein executing the workflow further comprises:
  iterating through the plurality of characters detected in the digital document over a plurality of iterations, wherein iterating through the plurality of characters includes:
    generating the graph for each character of the plurality of characters;
    evaluating the graph for each character of the plurality of characters using the trained machine-learning model; and
    classifying each character of the plurality of characters as manipulated or not manipulated;
  identifying a number of characters that have been classified as manipulated; and
  determining whether the digital document has been manipulated based on the number of characters classified as manipulated and a threshold.

7. The computer-implemented method of claim 1, wherein inputting the single vector representation of the graph into the trained machine-learning model further comprises:
  inputting the single vector representation of the graph into a random forest model.

8. A system, comprising:
  one or more processors; and
  a non-transitory computer-readable medium communicatively coupled to the one or more processors and storing program code executable by the one or more processors implementing an artificial intelligence (AI) architecture configured to detect a manipulated character in a digital document, the AI architecture comprising:
    a graph feature extraction system configured to:
      access a digital document that includes a plurality of characters;
      define a bounding box surrounding each character of the plurality of characters;
      generate a graph representing a character of the plurality of characters, the graph including a set of nodes, and each node of the set of nodes corresponding to one of the bounding boxes defined in the digital document; and
      extract one or more features for each node of the set of nodes of the graph;
    a vector generator configured to combine the one or more features for each node of the set of nodes of the graph into a single vector representation; and
    a trained machine-learning model configured to receive the single vector representation of the graph as an input and generate an output indicating a classification of the character as manipulated or not manipulated.

9. The system of claim 8, wherein the graph feature extraction system is further configured to:
  define a central node of the set of nodes of the graph, the central node corresponding to a bounding box surrounding the character; and
  define a plurality of neighboring nodes of the set of nodes of the graph, each neighboring node of the plurality of neighboring nodes corresponding to a bounding box surrounding another character of the plurality of characters.

10. The system of claim 8, wherein the graph feature extraction system is further configured to:
  identify a first y-axis value of a first bounding box in the digital document, the first bounding box surrounding the character;
  identify a second y-axis value of a second bounding box surrounding another character of the plurality of characters;
  compare the first y-axis value and the second y-axis value; and
  determine that the first bounding box and the second bounding box are located on a same line of characters based on a result of the comparison.

11. The system of claim 8, wherein the graph feature extraction system is further configured to:
  determine the one or more features of a given node, wherein each feature of the one or more features of the given node is determined by executing one or more techniques from amongst a plurality of techniques, and the plurality of techniques including:
    a first technique for determining a height or width of the character based on a height or width of the bounding box surrounding the character;
    a second technique for determining a y-value difference between the bounding box surrounding the character and a bounding box surrounding another character;
    a third technique for determining a distance between the bounding box surrounding the character and the bounding box surrounding the other character;
    a fourth technique for determining one or more Hu moments of the character contained within the bounding box; and
    a fifth technique for determining a principal inertia axis associated with the bounding box surrounding the character.

12. The system of claim 11, wherein the graph feature extraction system is further configured to:
  determine the principal inertia axis by inputting at least Hu moment of the one or more Hu moments into a singular value decomposition (SVD) model.

13. The system of claim 8, wherein the AI architecture is further configured to:
  iterate through the plurality of characters detected in the digital document over a plurality of iterations, wherein iterating through the plurality of characters includes:
    generating the graph for each character of the plurality of characters;
    evaluating the graph for each character of the plurality of characters using the trained machine-learning model; and
    classifying each character of the plurality of characters as manipulated or not manipulated;
  identify a number of characters that have been classified as manipulated; and
  determine whether the digital document has been manipulated based on the number of characters classified as manipulated and a threshold.

14. The system of claim 8, wherein the trained machine-learning model is a random forest model.

15. A computer-program product tangibly embodied in a non-transitory machine-readable storage medium, including instructions configured to cause a processing apparatus to perform operations including:

accessing a digital document that includes a plurality of characters;

defining a bounding box surrounding each character of the plurality of characters; and executing a workflow for detecting a manipulated character in the digital document, the workflow including:

generating a graph representing a character of the plurality of characters, the graph including a set of nodes, and each node of the set of nodes corresponding to one of the bounding boxes defined in the digital document;

extracting one or more features for each node of the set of nodes of the graph;

combining the one or more features for each node of the set of nodes of the graph into a single vector representation;

inputting the single vector representation of the graph into a trained machine-learning model; and determining, based on an output of the trained machine-learning model, a classification of the character as manipulated or not manipulated.

16. The computer-program product of claim 15, wherein the operation of generating the graph representing the character further comprises:

defining a central node of the set of nodes of the graph, the central node corresponding to a bounding box surrounding the character; and defining a plurality of neighboring nodes of the set of nodes of the graph, each neighboring node of the plurality of neighboring nodes corresponding to a bounding box surrounding another character of the plurality of characters.

17. The computer-program product of claim 15, wherein the operation of generating the graph representing the character further comprises:

identifying a first y-axis value of a first bounding box in the digital document, the first bounding box surrounding the character;

identifying a second y-axis value of a second bounding box surrounding another character of the plurality of characters;

comparing the first y-axis value and the second y-axis value; and determining that the first bounding box and the second bounding box are located on a same line of characters based on a result of the comparison.

18. The computer-program product of claim 15, wherein the operation of extracting the one or more features for each node of the set of nodes of the graph further comprises:

determining the one or more features of a given node, wherein each feature of the one or more features of the given node is determined by executing one or more techniques from amongst a plurality of techniques, and the plurality of techniques including:

a first technique for determining a height or width of the character based on a height or width of the bounding box surrounding the character;

a second technique for determining a y-value difference between the bounding box surrounding the character and a bounding box surrounding another character;

a third technique for determining a distance between the bounding box surrounding the character and the bounding box surrounding the other character;

a fourth technique for determining one or more Hu moments of the character contained within the bounding box; and a fifth technique for determining a principal inertia axis associated with the bounding box surrounding the character.

19. The computer-program product of claim 18, wherein determining the one or more features for the given node further comprises:

determining the principal inertia axis by inputting at least Hu moment of the one or more Hu moments into a singular value decomposition (SVD) model.

20. The computer-program product of claim 15, wherein the operation of executing the workflow further comprises:

iterating through the plurality of characters detected in the digital document over a plurality of iterations, wherein iterating through the plurality of characters includes:

generating the graph for each character of the plurality of characters;

evaluating the graph for each character of the plurality of characters using the trained machine-learning model; and classifying each character of the plurality of characters as manipulated or not manipulated;

identifying a number of characters that have been classified as manipulated; and determining whether the digital document has been manipulated based on the number of characters classified as manipulated and a threshold.

* * * * *